July 28, 1925.   1,547,319
F. P. GORIN
BOOKKEEPING MACHINE
Filed Sept. 30, 1920   5 Sheets-Sheet 3
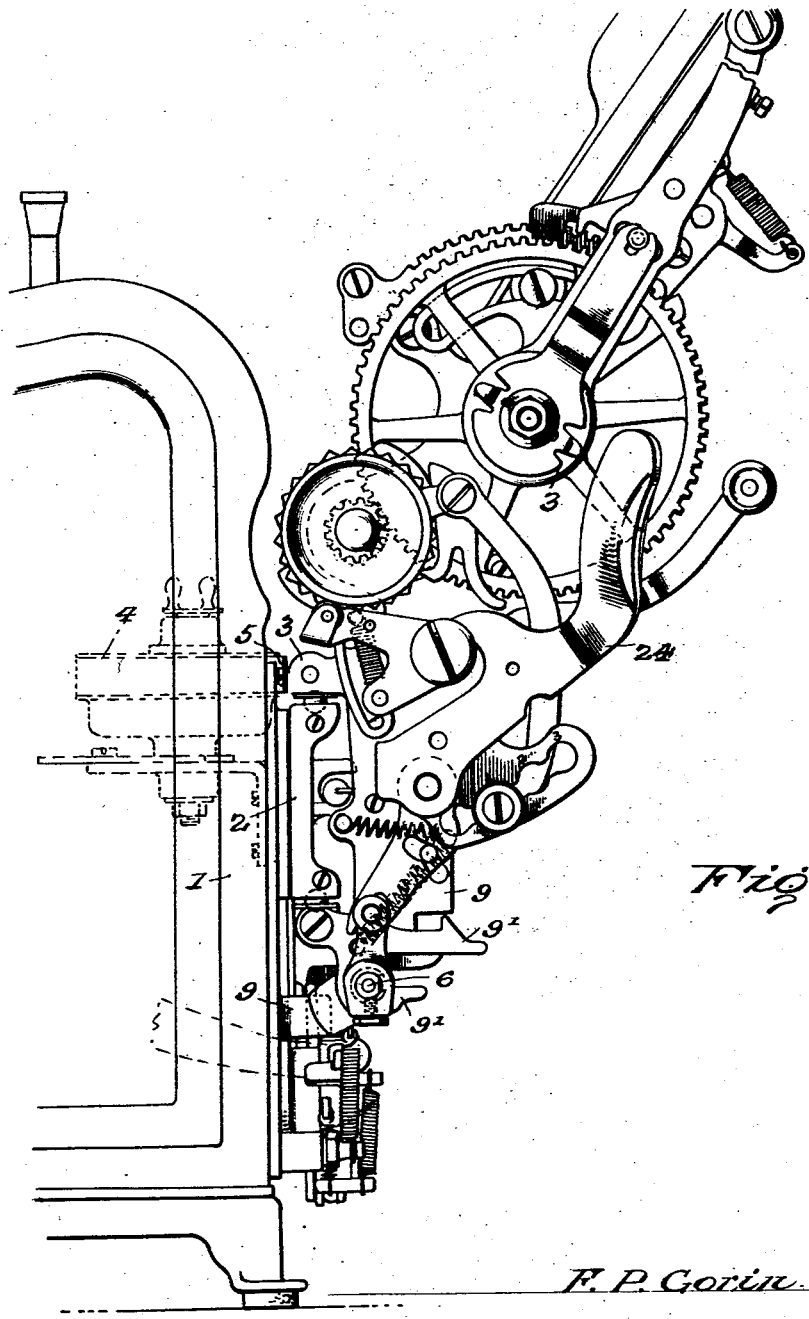
Fig. 3.
F. P. Gorin    INVENTOR.
BY  ATTORNEY.

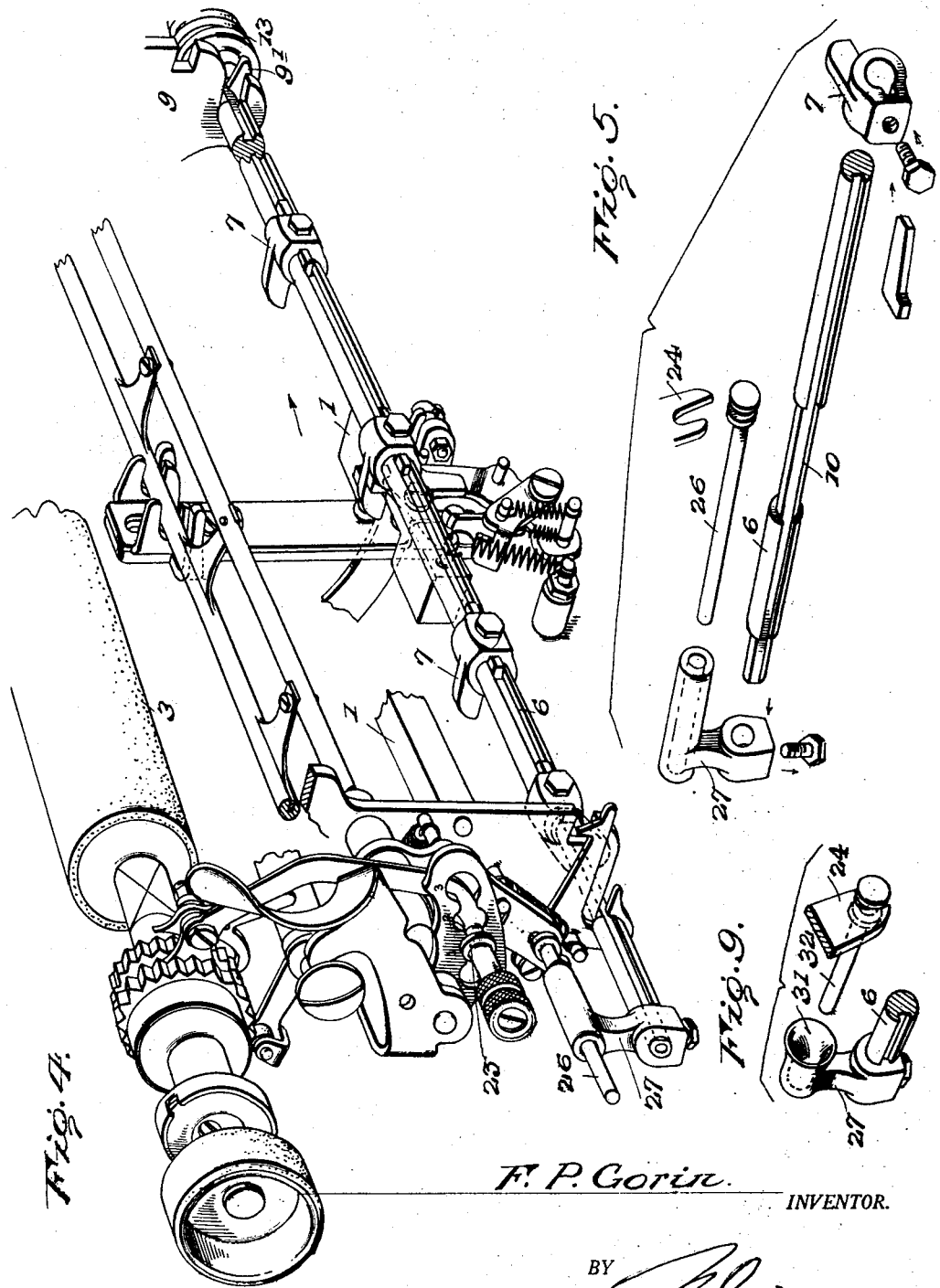

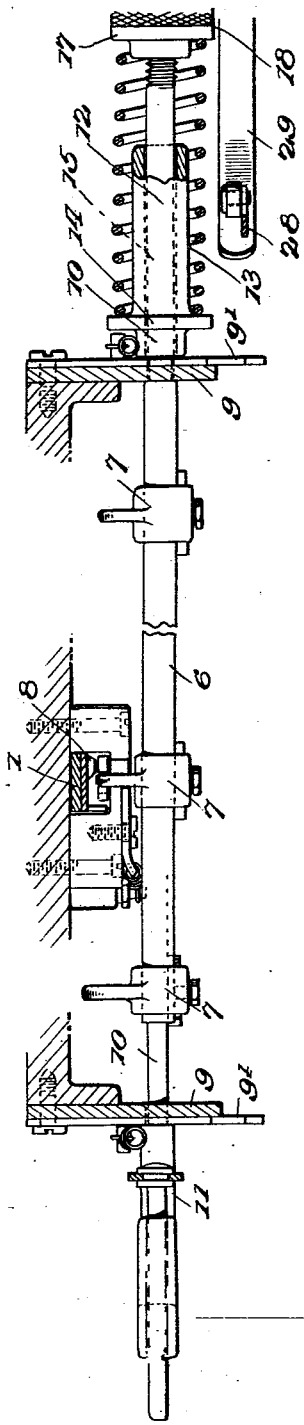

Patented July 28, 1925.

1,547,319

UNITED STATES PATENT OFFICE.

FRED P. GORIN, OF SEATTLE, WASHINGTON.

BOOKKEEPING MACHINE.

Application filed September 30, 1920. Serial No. 413,801.

*To all whom it may concern:*

Be it known that I, FRED P. GORIN, a citizen of the United States of America, residing at Seattle, in the county of King and State of Washington, have invented certain new and useful Improvements in Bookkeeping Machines, of which the following is a specification.

This invention is directed generally to an improvement in bookkeeping machines, and more particularly to a buffer means for the carriage of such machines, whereby the carriage is permitted to travel beyond the writing point against the tension of a buffer, and return to such point under the reflex action of said buffer.

This buffer action for a more effective result may be combined, as is preferred, with an independent means for locating the carriage at the writing point, that is means for so influencing the reflex action of the buffer proper, as to so control the carriage movement, that the carriage will be at rest when it reaches such writing point under the reflex action of the buffer.

Bookkeeping machines of the type herein shown and described involve generally a carriage capable of movement under the influence of a motor spring and positioned by cooperation of tabulator stops, which are normally in a relatively operative plane. The manually operative keys of a machine of this type select and position the proper type, and following such positioning of the type, a further manual operation causes the selected and positioned type to be simultaneously impressed upon the paper and as a continuation of this operation, thru mechanism automatically set in motion by such operation, the tabulator stop bar is rocked to disengage the particular tabulator stops and permit the carriage under the influence of its motor spring to move to a position indicated by the next successive tabulator stop on the stop rod. As ordinarily arranged, this movement of the carriage to the next tabulator stop is a comparatively rapid one, and as the carriage is heavy the impact shock is a material strain upon the parts of the machine, and is further productive of an undesirable noise.

As previously stated, there is an appreciable time interval following the imprint of the selected type upon the paper, and the automatic release of the then tabulator stop and the positioning of the carriage at the next tabulator stop, and also an appreciable interval between the time of arrival of the carriage at the new tabulator stop position and the selection and operation by the operator of the keys to position a new set of type for the next imprint. In the present invention this time interval has been found amply sufficient to allow of a buffer control of the carriage, that is a movement of the carriage past the writing position against the action of a buffer and the return of the carriage to the writing position thru the use of the buffer alone or combined with that of a separate locating means and preferably one serving to retard such movement of the carriage under the reflex action of the buffer, so that when the printing operation is to be performed, the carriage will have positioned itself at rest in the writing position without appreciable shock or jar.

The present invention in its specific application as described contemplates therefore a relative movement between the carriage and tabulator stop rod, and this necessary movement requires a movable control between the usual hand tripping mechanism employed in such machines and the tabulator stop rod. As heretofore constructed, this hand tripping mechanism, which is used in returning the carriage to a new line position, merely rocks the stop rod to disconnect the tabulator stops, which stops as before stated are always in an operative plane relative to each other. In the present invention however, the carriage is movable relative to the stop rod, and hence the hand tripping means, which is movable with the carriage, must be prevented from operative disconnection with the stop rod. To secure this result, the connection between such hand tripping means and the stop rod is made slidable with a disconnecting limit beyond any possible relative movement of the stop rod and carriage, and hence the stop rod is always under the usual control by the hand tripping means.

In the drawings:—

Fig. 3 is an enlarged side view looking from the opposite side of the machine.

Fig. 4 is a detail perspective view of the attachment.

Fig. 5 is a detail perspective view, parts separated, of the stop rod and associated parts.

Fig. 6 is a detail plan partially in section of the stop bar and associated parts.

Fig. 7 is an enlarged detail section of the buffer mechanism.

Fig. 8 is a detail perspective view of the latch and locator.

Fig. 9 is a detail perspective view of the means employed for preventing a permanent disconnection of the stop rod and tripping means.

Figure 1:
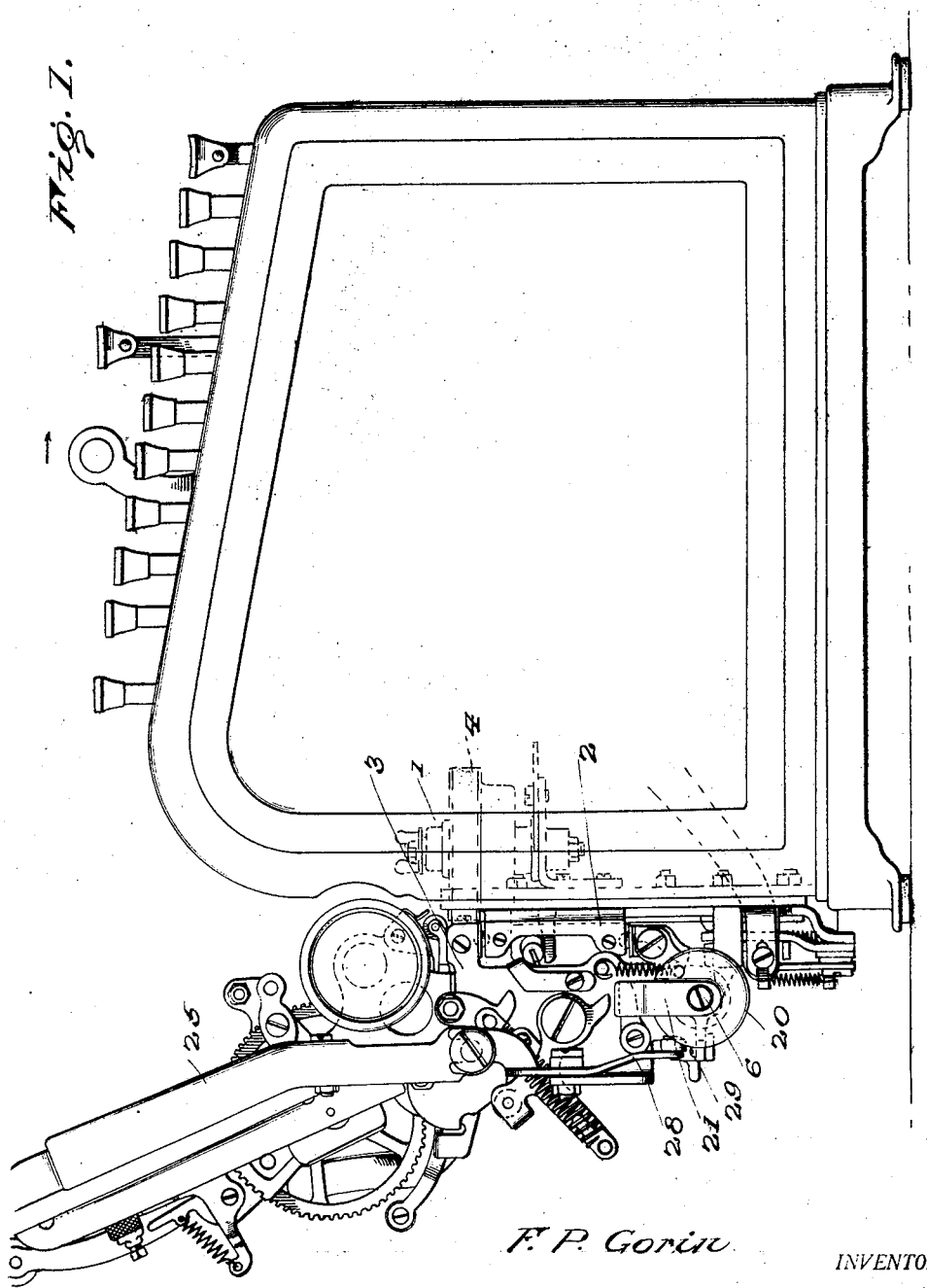
Fig. 1 is a side elevation of a bookkeeping machine illustrating the application of my invention.
Figure 2:
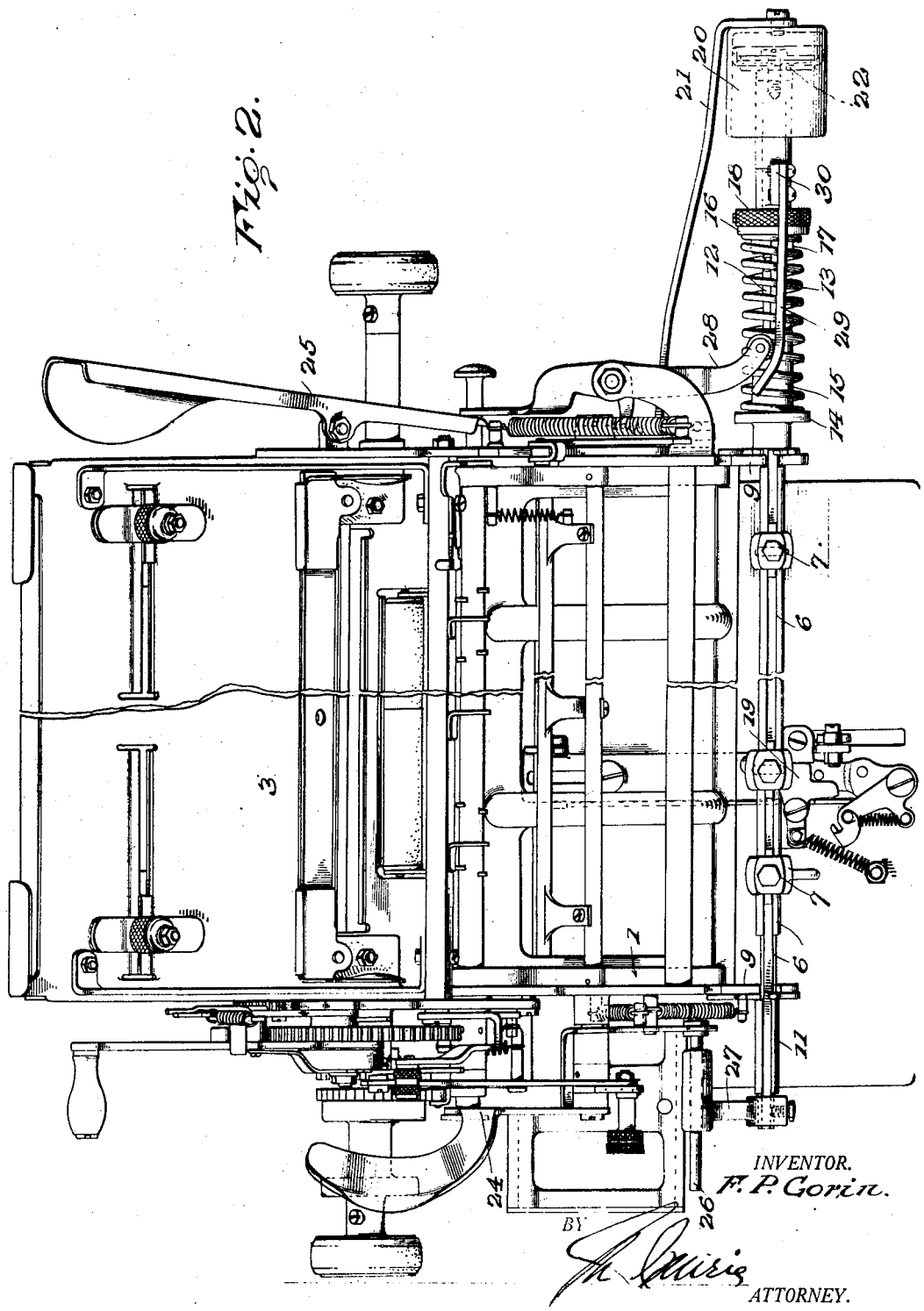
Fig. 2 is a plan view of the same.

In the construction to be described, it is to be understood that only those parts of the bookkeeping machine essential to the understanding of the present invention will be referred to, and such parts as are referred to, as well as other necessary parts neither shown or described, are merely indicative of an operative bookkeeping machine, there being no limitation either in the description or claims as to any specific construction, arrangement, or cooperation of parts of any particular bookkeeping machine, except in so far as they may be directly modified for the purposes of this invention.

For the purposes of the present invention, the improved bookkeeping machine may be briefly described as comprising a frame 1, on which is secured a trackway 2, slidably receiving and supporting a carriage 3. The carriage is operated in one direction, when free to move thru a motor spring drum 4 connected by a tape band 5 to the carriage.

A stop rod 6 is mounted in and movable with the carriage, on which rod there is mounted a series of tabulator stops 7, preferably provided for selective adjustment lengthwise the rod at will. These tabulator stops 7 are designed to cooperate with a fixed stop 8 secured on the frame 1, and as usual in this type of machine, the stop rod while capable of a rocking motion, is normally held, so that the stops 7 are in the plane of the stop 8. That is, in the normal position of the parts, the stops 7 and 8 will always engage to arrest the parts at a predetermined writing point.

The stop rod 6 is removably mounted in ears 9, depending from the carriage, and held by keepers 9' and said rod for a determinate distance beyond such ears in the direction of operative movement of the carriage, is somewhat reduced in diameter as at 10 to thereby permit a relative movement between the stop bar and carriage commensurate with the length of such reduced portion. By this construction, a relative movement is permitted between the carriage and stop rod as is necessary for the specific buffer action of the carriage following a tabular stop contact.

The tabular stop rod extends in both directions beyond the sides of the carriage proper, a comparative short extension 11 being at the final writing end of the carriage and a somewhat longer extension 12 beyond the opposite end of the carriage. On the extension 12 is arranged a coil spring 13 bearing at the carriage end against an annular shoulder 14 of a barrel 15 loosely encircling the stop rod, the end of the barrel bearing against the adjacent ear 9. The opposite end of the spring bears against an annular shoulder 16 of a comparatively short barrel 17, loose on the stop rod and bearing against a knurled nut 18, which latter, as indicated has threaded connection with the stop rod. Thus the spring is held between a part of the carriage, that is the ear 9, and an adjustable member on the stop rod as the nut 18, so that any movement of the carriage independent of the stop rod in the feed direction of the carriage is against the tension of this spring.

Assuming the carriage free to move under the influence of its motor spring, such movement will continue until the particular stop 7 on the stop rod engages the fixed stop 8 on the frame, which marks the writing point. The inertia of the carriage however, will cause the carriage to continue past this point against the tension of the spring 13 until the carriage motion is arrested by said spring and returned to the writing point. If the control of the carriage in this operation was left entirely to the spring 13, said carriage would or might continue by the writing point in contra writing direction, return again to it and after more or less vibration finally settle to a point of rest at the writing point. While as before stated there is a time interval in the operation of the parts which can be consumed in thus providing for the buffer movement of the carriage, it is imperative that the carriage come to rest at the writing point before any printing operation can possibly be carried out. This buffer spring would therefore act to quickly return the carriage to the writing point under all operative conditions, but for a more perfect result, a separate locating means may be and preferably is provided for the carriage which will act to prevent any movement of the carriage beyond the writing point in contra writing direction as described above. I prefer to employ a form of such separate locating means which acts in opposition to the reflex or rebound action of the spring 13, and which so controls the movement of the carriage under such spring action as to gradually absorb the force at the reflex action of the buffer 13 and finally locate the carriage at the exact writing point without its having passed that point in contra writing direction in a tabulating operation.

As a contemplated and operative form of such first mentioned locator there may be provided a latch, as 19, against which the particular stop 7 on the stop rod will engage to prevent movement of such stop rod beyond the writing point in contra feed direction. Under reflex action of the spring 13, the carriage returning to its limit on the stop rod, which is of course the writing point, will be at once arrested against further movement as the particular stop is held against such latch. Thus a complete and practically effective locating of the carriage at the writing point will be had following the buffer action of the spring 13, and this movement of the carriage under the reflex action of spring 13 is somewhat cushioned, as it will be remembered that such carriage return movement is against the pull of the motor spring tape 5. But this type of locator may prove objectionable owing to the necessary noise of impact on such return movement and therefore the invention additionally provides for a locator which will gradually absorb the movement of the carriage under the reflex action of spring 13, so that as the carriagea reaches the writing point, substantially all reflex action of spring 13 has been absorbed and the carriage comes to rest and is located at the writing point with the minimum of shock and noise. This latter carriage locating means is here shown as a cushion element in the form of a dash pot, the cylinder 20, of which is supported by an arm 21 extending from the carriage and the cooperating member or piston 22 is secured upon the end of the tabular stop bar 6. This locator acts to cushion the reflex movement of the carriage under the influence of the spring 13, so that with the parts adjusted as may be necessary in the particular instance, the return or rebound action of the carriage will carry the latter to the writing point, that is the position assumed exactly as if the carriage and stop rod had no relative longitudinal movement whatever, as in the constructions heretofore proposed. It has been previously stated that following an impression movement of the selected type, the stop rod is automatically rocked to disengage the particular stop 7 cooperating with the frame stop 8, to thus release the carriage and permit it to move to the next stop position. The tripping means whereby the automatic rocking of the stop rod is indicated generally at 23, and as this is the usual mechanism employed in bookkeeping machines of the type illustrated, no particular detail description of such part is necessary herein. However, as the stop 7 on the stop rod and the stop 8 on the frame are normally in the same plane, that is will normally engage, it is necessary to rock the stop rod when desired to return the carriage to an initial writing position, as for the next line. This manual operation of the stop rod is usual in machines of this type, being generally accomplished thru the operation of hand tripping release levers 24 and 25 at the respective ends of the carriage, either of which will accomplish the function desired, and merely provide a means at each end of the carriage for the convenience of the operator. As heretofore constructed, these hand tripping means have merely had a pivotal connection with the stop rod, as no relative movement of the stop rod and carriage other than thru the rocking movement was possible in such previous constructions. In the present invention however, there is a relative longitudinal movement between the stop rod and carriage, for the buffer action described, and hence a relative longitudinal movement between the hand tripping means and stop rod. To this end the hand tripping means 24 is provided at an appropriate point with a rod-like projection 26 adapted to slidably engage the sleeve-like terminal of an arm 27 extended laterally from the stop rod. The rod like projection 26 is carried by the sleeve-like terminal of the arm 27, such rod 26 having spaced heads to fit against opposite sides of the tripping means, with the latter having a slot open at the bottom into which the bar is moved to provide the connection. This detail is exactly shown in Fig. 4. The rod 26 is of a length exceeding the possible independent movement of the carriage relative to the stop rod, and hence disconnection of hand tripping means 24 and the stop rod is guarded against under any and all possible relative movements of the stop rod and carriage. The release member 25 at the opposite end of the carriage is provided with an arm 28 terminating in a roller adapted to bear upon a strip 29 secured to an arm 30 extending laterally from the stop rod immediately beyond the spring 13, so that the movement of the hand tripping means 25 causes the roller to exert pressure upon the strip, and so rock the stop rod in a desired direction. The strip 29 is of course of sufficient length to prevent the roller riding off the same in any relative movement of the carriage and stop rod, and hence the hand tripping means 25 is prevented from operative disconnection from the stop rod in any and all positions of the stop rod and carriage due to their relative movement for buffer action.

In Fig. 9 there is illustrated a means designed in operation to prevent a permanent disconnection of the stop rod and hand tripping means 24, though in this form, the connection is not maintained at all times. As will be apparent, the stop rod arm 27 is in this instance formed with an opening 31 to receive a pin 32 carried by an appropriate part of the hand tripping means. In the relative movement of the stop rod and carriage incident to the tabulating operation, as herein provided for, the pin 32 will actually separate from the arm 27, but in the return to normal relation of the carriage and stop rod following the buffer action, said pin will re-enter the opening 31 in the arm to again establish the connection. The entrant end of the opening 31 may, if desired, be flared, as shown, or reversely the pin 32 may be tapered at the entrant end (though this detail is not illustrated) to facilitate the re-connection of the parts. This modification prevents a permanent disconnection of the hand tripping means and stop rod, though it is apparent that there is an actual separation during relative movement of the parts.

The characteristic feature of the present invention resides essentially in a means to cushion the movement of the carriage, due to which the carriage is permitted to travel by the writing point determined by the tabulator stops. In bookkeeping machines of the character with which this invention is more particularly employed, a definite cycle of operations is carried out in each operation of the machine. First, the necessary number keys are depressed to arrange the desired type in printing position. Following this type selection, a release key is operated which sets in motion automatic mechanism within the machine to accomplish a printing movement of the selected type, a restoring of such selected type to normal position, and during this period the normally operative tabulating means is also automatically released to permit the carriage to move to the next tabular stop, or new writing point for the next printing operation. However before the next printing operation can take place, the number keys must be operated manually to again provide one or more selected type for the next printing operation. There is then in a complete cycle of operation of a machine of this type, two distinct and definite intervals of time between successive operations of the release key. The first such interval is during the automatic operation whereby the selected type is printed, the type restored to normal position, and the tabulating mechanism released, and the next such interval is that following the cessation of the operating mechanism and the manual selection of the next type for the printing operation. The buffer or carriage cushioning means of this invention operates more particularly in the second interval of time above referred to, and is so timed that the carriage is at rest at the writing point before a possible fresh selection of type can be set up and then imprinted upon the paper.

Claims:

1. In a bookkeeping machine, the combination with the carriage, tabulating mechanism which at all times controls the writing position of the carriage, of carriage-arresting means including a cushion, on which the carriage acts when its passes a predetermined position in a tabulating operation, said cushion being effective to return the carriage to that position, and means to locate the carriage at the predetermined position after it is repelled by said cushion, this means including another cushion.

2. In combination, a carriage, tabulating mechanism forming the sole control for the feeding movement of the carriage, carriage-arresting means including a cushion, on which the carriage acts when it passes a predetermined position in a tabulating operation, said cushion being effective to return the carriage to that position, and means to locate the carriage at. the predetermined position after it is repelled by said cushion, this means including another cushion.

3. In a bookkeeping machine, a carriage, tabulating mechanism forming the sole means for determining a particular one of a series of writing point positions of the carriage, said mechanism including a part connected with the carriage and a part connected with the machine frame, and a buffer means included in the connection between the carriage and tabulating mechanism part connected to such carriage.

4. In a bookkeeping machine, a carriage, tabulating mechanism forming the sole feed control for the carriage, said mechanism including a tabular stop bearing member mounted to permit an independent and relative movement of the carriage in a tabulating operation, and a combined buffer and locating means controlling such relative movement of the carriage.

5. In a bookkeeping machine, a carriage, a tabulating mechanism, including a tabular stop rod mounted in the carriage to permit a relatively independent movement of the carriage in a tabulating operation, a buffer control for such relative movement of the carriage, a hand tripping means for actuating the stop rod to release the tabulating mechanism, and means to maintain the operative connection of the hand tripping means and stop rod during the relatively independent movement of the carriage.

6. In a bookkeeping machine, a carriage, a tabulating mechanism, including a tabular stop rod mounted in the carriage to permit a relatively independent movement of the carriage in a tabulating operation, a buffer control for such relative movement of the carriage, a hand tripping means on the carriage for actuating the stop rod to release the tabulating mechanism, and means to maintain the operative connection of the hand tripping means and stop rod during the relatively independent movement of the carriage.

7. In a bookkeeping machine, tabulating mechanism forming the sole carriage positioning means, a carriage having an independent movement following a tabulating operation, a buffer to counteract such independent movement and return the carriage towards the writing point and an independent locating means for finally positioning the carriage at the writing point in a movement of the carriage responsive to such buffer.

8. In a bookkeeping machine, a carriage, tabulating mechanism for solely determining the writing point of the carriage, means to permit the carriage to move past said writing point in a tabulating operation, a buffer to resist such independent movement of the carriage and return the carriage toward the writing point, and a locating means to render the action of the buffer without effect on the carriage when said carriage has been so returned.

9. In a bookkeeping machine, a carriage, tabulating mechanism constructed to permit an independent movement of the carriage past the writing point which is solely determined by such tabulating mechanism, a spring to resist such movement and to create in the carriage a return movement toward the writing point, and means whereby the tension of the spring is gradually absorbed during such return movement of the carriage to limit such movement to the writing point.

10. In a bookkeeping machine, a carriage, tabulating mechanism constructed to permit an independent movement of the carriage past the writing point which is solely determined by such tabulating mechanism, a spring to resist such movement and to create in the carriage a return movement toward the writing point, and a dash pot for gradually absorbing the return tension of the spring, to thereby limit the return influence of the spring to an accurate location of the carriage at the writing point.

11. In a bookkeeping machine, a carriage, type selecting means, tabulating mechanism for the carriage, a release key, mechanism set in motion by the release key to print the selected type, return such type to normal position and operate the tabulating mechanism for a tabulating movement of the carriage, and means whereby the final movement of the carriage to the writing point determined by the tabulating operation may be cushioned during the interval between the operation of the release key and before the mechanism can be set for a subsequent operation of such keys.

12. In a bookkeeping machine, a carriage, tabulating mechanism, type selecting means, and a key operative following a type selecting operation to restore the parts to normal position and actuate the tabulating mechanism for a new writing position of the carriage, and buffer mechanism to absorb the carriage shock and position the carriage at the new writing point in the interval between an initial operation and the release key and the possible arrangement of the machine parts for a second operation of such release key.

13. In a bookkeeping machine, having type to be manually selected and set in a printing position, an automatic means for printing said type, moving the carriage to a new writing point and returning the selected type to normal position as a continued operation, and a buffer means acting to cushion the carriage in movement from one writing position to the next with said means timed for complete operation in the interval of machine operation between one manual type selection for printing and any possible successive similar selection.

14. In a bookkeeping machine, a carriage, a tabulating mechanism, including a tabulator stop rod mounted in the carriage to permit a relatively independent movement of the carriage in a tabulating operation, a buffer control for such relative movement of the carriage, a hand tripping means for actuating the stop rod to release the tabulating mechanism, and means to insure a control of the stop rod by said hand tripping means in any relation of such parts.

15. In a bookkeeping machine, a carriage, tabulating mechanism, including a tabulator stop rod mounted in the carriage to permit a relatively independent movement of the carriage in a tabulating operation, a buffer control for such relative movement of the carriage, and means for actuating the stop rod to release the tabulating mechanism preparatory to returning the carriage to initial position, and means to insure control of the stop rod by said rod actuating means under all operative conditions.

16. In a bookkeeping machine, the combination with a movable carriage, of stop mechanism for determining and maintaining fixed the point at which the carriage is to be stopped, a cushion for relieving the force of the impact of the carriage when engaged by the stop mechanism, and resilient means for absorbing the recoil imparted to the carriage by the cushion.

17. In a bookkeeping machine, the combination of a movable carriage, stop mechanism, a movable element connected with the carriage and adapted to be engaged by the stop mechanism to determine and maintain fixed the writing point, a cushion interposed between the movable element and the carriage and adapted to relieve the force of the impact of the carriage when the stop mechanism is operated, and a cushioning device interposed between said movable element and the carriage and adapted to absorb the recoil between the carriage and the movable element due to the action of said cushion.

18. In a bookkeeping machine, tabulating mechanism, including a frame stop and a carriage stop, a movable element connected with the carriage and adapted to be engaged by the frame stop to determine and maintain fixed the writing point, a cushion interposed between the movable element and the carriage and adapted to relieve the force of the impact of the carriage when the stop mechanism is operated, and a cushion interposed between said movable element and the carriage and adapted to absorb the recoil between the carriage and the movable element due to the reaction of said first mentioned cushion.

19. In a bookkeeping machine, a carriage, a tabulating mechanism including a frame-carried stop and a carriage-carried stop adapted in cooperation to determine and maintain fixed a writing position of the carriage, said stops being normally in a plane insuring cooperation and one of said stops being adapted to be moved out of said plane and to release the carriage, one of said stops being movable relative to its normal position following and as a result of cooperation with the other stop, and means to cushion said stop movement and absorb the reaction of such cushion to finally arrest the carriage at a point determined by the normal stop cooperation.

20. In a bookkeeping machine, a tabulating mechanism including a carriage, a controllable stop movable therewith and cooperating with a frame stop to determine and fix a carriage writing position, said carriage and stop having a relatively independent movement following a stop cooperation, means to cushion the carriage during such relative movement and to position the carriage at a new writing point, the stop being controllable whenever the stop and carriage are in their normal relation to each other.

21. A tabulating mechanism for controlling successive writing points of a carriage, including a series of stops normally movable with the carriage, and a stop with which said carriage-carried stops are adapted to cooperate for the tabulating control to determine and fix the carriage writing point, the carriage-carried stops being normally in a plane to engage with the other of said stops and adapted to be moved out of said plane at will, said carriage being movable relative to the carriage-carried stops in a tabulating operation, and means to cushion this relative carriage movement and to return said carriage to its normal relation with its stops while the coacting stops of the tabulating mechanism remain in tabulating cooperation.

22. A tabulating mechanism for controlling successive writing points of a carriage including a relatively fixed stop, a series of stops capable of relative rotative movement with respect to the carriage, said series of stops having such normal relation to the carriage as to engage the fixed stop, said carriage having a relative longitudinal movement with respect to said series of stops following the engagement of one of said stops with the fixed stop, means arranged to cushion the carriage in such relative longitudinal movement, means arranged to absorb the reaction of said cushion to gradually reduce the return movement of the carriage toward normal position, both said means acting during the stop engagement.

23. In a bookkeeping machine, a carriage, a tabulating mechanism including a frame carried stop and a carriage-carried stop adapted for cooperation to determine and fix a writing position of the carriage, said stops being normally in a plane insuring cooperation and one of said stops being adapted to be moved out of said plane to release the carriage, one of said stops being movable relative to its normal position following and as a result of cooperation with the other stop, and means to cushion said stop movement and absorb the reaction of said cushion to finally arrest the carriage at a point determined by the normal stop cooperation, said cushioning operation being carried out without interfering with and during said stop cooperation.

24. In a tabulating mechanism, a carriage, a stop bar mounted for longitudinal and rotary movement in the carriage, a relatively fixed stop, a series of stops on said bar normally positioned to cooperate with said fixed stop to determine and fix the carriage writing point, the mounting of the stop bar in the carriage permitting an independent movement of the carriage following the engagement of any stop on the stop bar with the fixed stop, and cushioning means for such relative carriage movement, said cushioning means being carried by the stop bar and rendered effective as a cushioning means immediately following the engagement of any stop on the stop bar with the fixed stop.

25. In a tabulating mechanism, a carriage, a stop bar mounted for longitudinal and rotary movement in the carriage, a relatively fixed stop, a series of stops on the stop bar normally arranged in the plane of the fixed stop to determine and fix the carriage writing point, means for imparting rotary movement to said bar to arrange the stops carried thereby beyond the plane of the fixed stop, the relative longitudinal movement between said bar and carriage permitting independent movement of the carriage following a stop cooperation, and means carried by the stop bar and rendered effective only following stop cooperation to cushion the independent movement of the carriage.

26. In a tabulating mechanism, a carriage, a stop bar mounted for longitudinal and rotary movement in the carriage, a relatively fixed stop, a series of stops on the stop bar normally arranged in the plane of the fixed stop to determine and fix the carriage writing point, means for imparting rotary movement to said bar to arrange the stops carried thereby beyond the plane of the fixed stop, the relative longitudinal movement between said bar and carriage permitting independent movement of the carriage following a stop cooperation, and means to absorb the reaction of said cushion to finally arrest the carriage in normal relation to the stop bar.

27. In a bookkeeping machine and carriage, a stop bar, mounted in the carriage and provided with stops, a relatively fixed stop in the normal plane of said carriage stops to determine and fix the carriage writing point, mechanism whereby the stop may be rotated with respect to the carriage to arrange the stops thereon beyond the plane of the fixed stop, said carriage having a free longitudinal movement with respect to the stop bar, means for cushioning this independent movement of the carriage following engagement of a stop on the stop bar with the fixed stop, and a sliding connection between the stop bar and the mechanism for rotating the stop bar, to thereby maintain rotative control of the stop bar in all relative positions of the parts.

28. In a bookkeeping machine, a carriage, a stop bar removably mounted in the carriage and adapted for rotative longitudinal movement therein, a relatively fixed stop, stops on the stop bar adapted in the normal position of said bar relative to the carriage to engage the fixed stop to determine and fix the carriage writing point, means whereby the bar may be rotated with respect to the carriage to move the stops on said bar beyond the plane of the fixed stop and thereby free the carriage from stop control, the stop cooperation arresting the movement of the stop bar without arresting the movement of the carriage, and a cushioning means being rendered effective by the arresting of the movement of the stop bar.

29. A stop bar for bookkeeping machine carriages which have hand tripping means, the combination with the bar of a buffer adapted in use to operate between the bar and a carriage, and means arranged to maintain the usual working relation between the hand tripping means and the bar under working conditions.

30. A stop bar for bookkeeping machine carriages which have auxiliary tripping means, the combination with a bar of means to permit a relative longitudinal and rotary movement between the bar and a carriage when applied thereto, a cushion adapted in use to operate between the bar and the carriage, and means to maintain the usual working relation between the auxiliary tripping means and the bar under working conditions.

31. A stop bar for bookkeeping machine carriages having a main and an auxiliary tripping mechanism, comprising a bar, a buffer adapted to be interposed between the bar and a carriage, means which permits of a longitudinal and a rotary movement of the bar with respect to a carriage, when applied thereto and means on the bar which is adapted to at all times coact with the auxiliary tripping means whenever the bar and carriage are in their normal relation with respect to each other.

32. A stop bar for bookkeeping machine carriages which have hand tripping means, the combination with the bar of a buffer adapted in use to operate between the bar and a carriage, and means arranged to maintain the usual working relation between the hand tripping means and the bar when the structure is assembled, and carriage-rebound limiting means.

33. A stop bar for bookkeeping machine carriages which have auxiliary tripping means, the combination with a bar of means to permit a relative longitudinal and rotary movement between the bar and a carriage when applied thereto, a cushion adapted in use to operate between the bar and the carriage, and means to maintain the usual working relation between the auxiliary tripping means and the bar when the parts are assembled, and carriage-rebound limiting means.

34. A stop bar for bookkeeping machine carriages having a main and an auxiliary tripping mechanism, comprising a bar, a buffer adapted to be interposed between the bar and a carriage, means which permits of a longitudinal and a rotary movement of the bar with respect to a carriage when applied thereto, means on the bar which is adapted to at all times coact with the auxiliary tripping means whenever the bar and carriage are in their normal relation with respect to each other, and carriage-rebound limiting means.

35. A tabulating mechanism for controlling successive writing points of a carriage, including a relatively fixed stop, a series of stops capable of relative rotative movement with respect to the carriage, said series of stops having such normal relation to the carriage as to engage the fixed stop, said carriage having a relative longitudinal movement with respect to said series of stops following the engagement of one of said stops with the fixed stop, means for tripping the series of stops to permit the carriage to move to a new writing point, means arranged to cushion the carriage in its relative longitudinal movement, and means arranged to absorb the reaction of said cushion to gradually reduce the return movement of the carriage toward normal position, both the said means acting during the stop engagement.

36. In a bookkeeping machine, a carriage, a tabulating mechanism including a frame-carried stop, and a carriage-carried stop adapted in cooperation to determine a writing position of the carriage, said stops being normally in a plane insuring cooperation of said stops, means for moving one of said stops out of the said plane to release the carriage, and means to cushion said stop movement and absorb the reaction of said cushion to finally arrest the carriage at a point determined by the normal stop cooperation.

In testimony whereof I affix my signature.

FRED P. GORIN.